United States Patent
Shibayama et al.

(10) Patent No.: US 8,716,177 B2
(45) Date of Patent: May 6, 2014

(54) PRODUCTION PROCESS OF SULFIDE CONTAINING NICKEL AND COBALT

(75) Inventors: Keisuke Shibayama, Tokyo (JP); Satoshi Matsumoto, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 592 days.

(21) Appl. No.: 12/591,472

(22) Filed: Nov. 20, 2009

(65) Prior Publication Data

US 2010/0135878 A1  Jun. 3, 2010

(30) Foreign Application Priority Data

Nov. 28, 2008  (JP) ................................. 2008-303749

(51) Int. Cl.
*B01J 20/02* (2006.01)
*B01D 11/00* (2006.01)

(52) U.S. Cl.
USPC ....................................... 502/406; 423/150.1

(58) Field of Classification Search
None
See application file for complete search history.

(56) References Cited

U.S. PATENT DOCUMENTS

| | | | |
|---|---|---|---|
| 3,720,749 A * | 3/1973 | Taylor et al. | 423/141 |
| 3,819,801 A * | 6/1974 | Bell et al. | 423/138 |
| 3,928,020 A * | 12/1975 | Weir | 75/370 |
| 2001/0001650 A1 * | 5/2001 | Duyvesteyn et al. | 423/139 |
| 2003/0173308 A1 | 9/2003 | Kobayashi et al. | |
| 2004/0232084 A1 * | 11/2004 | Matsunami et al. | 210/709 |
| 2010/0018350 A1 | 1/2010 | Shibayama et al. | |

FOREIGN PATENT DOCUMENTS

| | | | |
|---|---|---|---|
| JP | 06-081050 A | | 3/1994 |
| JP | 2003-313617 A | | 11/2003 |
| JP | 2005-350766 A | | 12/2005 |
| JP | 2006-144102 A | | 6/2006 |
| RU | 2281978 C1 | | 8/2006 |
| WO | 2007079531 | * | 7/2007 |
| WO | WO-2007/079531 A1 | | 7/2007 |
| WO | WO 2007/112562 A1 | | 10/2007 |
| WO | 2007112562 | * | 11/2007 |
| WO | WO-2008/019633 A1 | | 2/2008 |

OTHER PUBLICATIONS

European Search Report dated Feb. 26, 2010, issued on the corresponding European Patent Application No. 09013964.3.

* cited by examiner

*Primary Examiner* — Melvin C Mayes
*Assistant Examiner* — Sheng H Davis
(74) *Attorney, Agent, or Firm* — Edwards Wildman Palmer LLP; James E. Armstrong, IV

(57) ABSTRACT

A production process of a sulfide containing nickel and cobalt by adding a sulfurizing agent under pressurization into an aqueous solution of sulfuric acid containing nickel and cobalt, which is capable of recovering nickel and cobalt as a sulfide in high yield, as well as enhancing the utilization efficiency of hydrogen sulfide gas.

A production process of a sulfide containing nickel and cobalt by adding a sulfurizing agent under pressurization into an aqueous solution of sulfuric acid containing nickel and cobalt, characterized by supplying, as the above sulfurizing agent, hydrogen sulfide gas into the vapor phase of inside of a reactor, as a major sulfurizing agent, as well as, by supplying an aqueous solution containing a sodium hydrosulfide, which is recovered by absorbing unreacted hydrogen sulfide gas, which is discharged from inside of the reactor in producing the above sulfide, with an aqueous solution of sodium hydroxide, into the liquid phase.

8 Claims, 3 Drawing Sheets

PRODUCTION PROCESS OF SULFIDE CONTAINING NICKEL AND COBALT

BACKGROUND OF THE INVENTION

1. Field of the Invention

The present invention relates to a production process of a sulfide containing nickel and cobalt, and in more detail, the present invention relates to a production process of a sulfide containing nickel and cobalt by adding a sulfurizing agent under pressurization into an aqueous solution of sulfuric acid containing nickel and cobalt, which is capable of recovering nickel and cobalt as a sulfide in high yield, as well as, enhancing the utilization efficiency of hydrogen sulfide gas.

2. Description of Prior Art

Conventionally, as a process for selectively precipitating and recovering a heavy metal contained in an aqueous solution of sulfuric acid containing impurity elements, a process for precipitating the heavy metal as a sulfide by a sulfurization reaction with adding a sulfurizing agent, has been used widely. For example, there has been proposed a method for controlling the sulfurization of a heavy metal by using a hydrogen sulfide gas as a sulfurizing agent, and by adjusting a concentration of hydrogen sulfide in the vapor phase (for example, refer to Patent Literature 1), or a method for obtaining a sulfide precipitate having good filtering separation property by adding an alkali sulfide as a sulfurizing agent into an acidic aqueous solution containing nickel and cobalt, and adjusting temperature and pH (for example, refer to Patent Literature 2) or the like. However, in any of these proposals, as shown below, there was a problem to be solved in practical view point.

That is, in the method for using a hydrogen sulfide as a sulfurizing agent, because of handling a hydrogen sulfide gas, which is toxic gas, fine reaction control is required in consideration of safety in practical aspect, as well as, because unreacted hydrogen sulfide gas is discharged, an abatement facility thereof is indispensible. In addition, a sulfurization reaction using a hydrogen sulfide generates an acid by a reaction, as shown in the following expression (1), and lowers pH of a reaction solution.

$$MSO_4 + H_2S = MS + H_2 + SO_4 \quad (1)$$

(wherein M represents a heavy metal element, for example, Ni or Co).

Therefore, because re-dissolution of a sulfide occurs when pH becomes equal to or lower than a specific value, depending on an element to be sulfurized, the sulfurization reaction becomes not to proceed. Accordingly, to make the sulfurization reaction proceed efficiently, the sulfurization reaction is performed either by controlling the lowering of pH by adjusting the element concentration of the reaction solution at equal to or lower than specific concentration, or under neutralizing a generating acid with adding an alkali.

On the other hand, in the method for using an alkali sulfide (for example, NaHS, $Na_2S$) as a sulfurizing agent, because the alkali sulfide is one obtained by absorbing and fixing a hydrogen sulfide gas into an aqueous solution of the alkali, and is stable chemically, it can be used simply and conveniently without having a large scale abatement facility. In addition, because the alkali sulfide itself is alkaline in the reaction, it has merit that pH of the reaction solution does not lower and re-dissolution of the sulfide associated therewith does not occur, different from the case of using hydrogen sulfide, and it can be recovered as a metal sulfide in high yield. However, as for a sulfide precipitate generated by using the alkali sulfide, there is a problem that mole ratio S/(Ni+Co) thereof is, for example, from about 1.1 to 1.2, higher value as compared with a sulfide generated by using a hydrogen sulfide, and it is also easily oxidized. That is, in the step for separating and recovering nickel and cobalt, using such a sulfide, there are big problems that a sulfate ion in a solution increases associated with oxidation, as well as, sulfur treatment load increases caused by excess sulfur content. For example, in the step for leaching the above sulfide precipitate using an oxidizing agent such as chlorine, prevention of sulfur dissolution into a solution generated by leaching becomes the most important leaching requisite.

It should be noted that, in recent years, as a hydrometallurgical process of a nickel laterite ore, High Pressure Acid Leach using sulfuric acid has been noticed. This process, different from a pyrometallurgical process, which is a conventional general metallurgical process of a nickel laterite ore, does not include a dry-type step such as a reducing step and a drying step, and composed of wet-type steps consistently, therefore, has merit that is advantageous in view of energy and cost. That is, in the above High Pressure Acid Leach, because nickel and cobalt can be leached selectively for iron, by controlling redox potential and temperature of a leach solution in a pressurized reactor in the leaching step, and fixing an iron, which is a major impurity, onto a leach residue in a form of hematite ($Fe_2O_3$), there is a very big merit.

In the High Pressure Acid Leach, there are included, for example, a leaching step for adding a sulfuric acid to slurry of a nickel laterite ore, leaching under high temperature and high pressure and obtaining a leach solution containing nickel and cobalt; a step for separating a solid and liquid of the leach solution; a neutralization step for adjusting pH of the leach solution containing impurity elements together with nickel and cobalt, to form neutralization precipitate slurry containing impurity elements such as iron, and washed mother liquor for nickel recovery; and a sulfurization step for supplying hydrogen sulfide gas into said mother liquor for nickel recovery to form a mixed sulfide of nickel and cobalt and barren liquor (for example, refer to Patent Literature 3).

In the above sulfurization step, it is an important technical problem, in managing the steps economically, to recover, in high yield, a mixed sulfide of nickel and cobalt, generated and obtain barren liquor, in which nickel and cobalt is sufficiently removed, by introducing the above mother liquor for nickel recovery into a pressurized reactor having a pressure resistance, and still more blowing, into the vapor phase of the reactor, gas for sulfurization, which is supplied from a synthesis facility of hydrogen sulfide gas, installed in the above plant, and controlling a sulfurization reaction with hydrogen sulfide gas in the liquid phase. However, as described above, pH lowers with proceeding of the sulfurization reaction, Ni concentration in a reaction completion solution increases at the time of reaction completion, and Ni recovery rate is deteriorated. Therefore, there was a problem that in the case where pH of the starting solution is low, pH of the reaction completion solution becomes low as well, and Ni recovery rate becomes low.

As a measure to solve this, in a method for using the above alkali sulfide as a sulfurizing agent, in order to obtain a sulfide suppressed the oxidation property, there has been disclosed a method for generating a precipitate of the sulfide, by adding the alkali sulfide into the above aqueous solution, after making inside of the reactor to non-oxidative gas atmosphere, while maintaining redox potential (based on an Ag/AgCl electrode) at −300 to 100 mV (for example, refer to Patent Literature 4). Although this method has merits in respect that nickel and cobalt can be recovered as a sulfide in high yield, and respect that enables to respond with a simple and convenient abatement facility and the like, use of the alkali sulfide as a sulfurizing agent has a problem of cost in the case of a solution with relatively low nickel concentration, like the above mother liquor for nickel recovery.

Under such circumstances, it has been desired to be capable of recovering nickel and cobalt as a sulfide in high yield, as well as, enhancing the utilization efficiency of hydrogen sulfide gas, in a production process of a sulfide by adding a hydrogen sulfide gas as a sulfurizing agent under pressurization into an aqueous solution of sulfuric acid containing nickel and cobalt, as a base.

[Patent Literature 1] JP-A-2003-313617 (page 1 and page 2)
[Patent Literature 2] JP-A-6-81050 (page 1 and page 2)
[Patent Literature 3] JP-A-2005-350766 (page 1 and page 2)
[Patent Literature 4] JP-A-2006-144102 (page 1 and page 2)

SUMMARY OF THE INVENTION

In view of the above problems in conventional technology, it is an object of the present invention to provide a production process of a sulfide containing nickel and cobalt by adding a sulfurizing agent under pressurization into an aqueous solution of sulfuric acid containing nickel and cobalt, which is capable of recovering nickel and cobalt as a sulfide in high yield, as well as, enhancing the utilization efficiency of hydrogen sulfide gas.

The present inventors have intensively studied a production process of a sulfide containing nickel and cobalt by adding hydrogen sulfide gas as a sulfurizing agent under pressurization into an aqueous solution of sulfuric acid containing nickel and cobalt, to attain the above object, and as a result, found that by supplying, as the above sulfurizing agent, a hydrogen sulfide gas into the vapor phase of inside of a reactor, as a major sulfurizing agent, as well as, by supplying an aqueous solution containing a sodium hydrosulfide, which is obtained by recovering an unreacted hydrogen sulfide gas, discharged from inside of the reactor in producing the above sulfide, into the liquid phase, as an auxiliary sulfurizing agent, nickel and cobalt can be recovered as a sulfide in high yield, as well as, utilization efficiency of hydrogen sulfide gas can be enhanced and have thus completed the present invention.

That is, according to a first aspect of the present invention, there is provided a production process of a sulfide containing nickel and cobalt by adding a sulfurizing agent under pressurization into an aqueous solution of sulfuric acid containing nickel and cobalt, characterized by supplying, as the above sulfurizing agent, hydrogen sulfide gas into the vapor phase of inside of a reactor, as a major sulfurizing agent, as well as, by supplying an aqueous solution containing sodium hydrosulfide, which is obtained by absorbing and recovering an unreacted hydrogen sulfide gas, which is discharged from inside of the reactor in producing the above sulfide, with an aqueous solution of sodium hydroxide, into the liquid phase.

In addition, according to a second aspect of the present invention, in the first aspect, there is provided the production process of a sulfide containing nickel and cobalt, characterized in that pressure inside the above reactor is from 100 to 300 kPa.

In addition, according to a third aspect of the present invention, in the first or second aspect, there is provided the production process of a sulfide containing nickel and cobalt, characterized, in that pH of the above aqueous solution of sulfuric acid containing nickel and cobalt, is from 3.0 to 3.8.

In addition, according to a fourth aspect of the present invention, in any one of the first to the third aspects, there is provided the production process of a sulfide containing nickel and cobalt, characterized in that temperature of the above aqueous solution of sulfuric acid containing nickel and cobalt, is from 65 to 90° C.

In addition, according to a fifth aspect of the present invention, in any one of the first to the fourth aspects, there is provided the production process of a sulfide containing nickel and cobalt, characterized in that the above aqueous solution of sulfuric acid containing nickel and cobalt, is mother liquor for nickel recovery obtained by separation of iron from a leach solution obtained in the step leaching under high temperature and high pressure, adding a sulfuric acid into slurry of a nickel laterite ore, in hydrometallurgical process of the nickel laterite ore by High Pressure Acid Leach.

A production process of a sulfide containing nickel and cobalt of the present invention is a production process of a sulfide containing nickel and cobalt by adding a sulfurizing agent under pressurization into an aqueous solution of sulfuric acid containing nickel and cobalt, and is capable of recovering nickel and cobalt as a sulfide in high yield, as well as, enhancing the utilization efficiency of hydrogen sulfide gas, therefore, industrial value thereof is very large.

Figure 1:
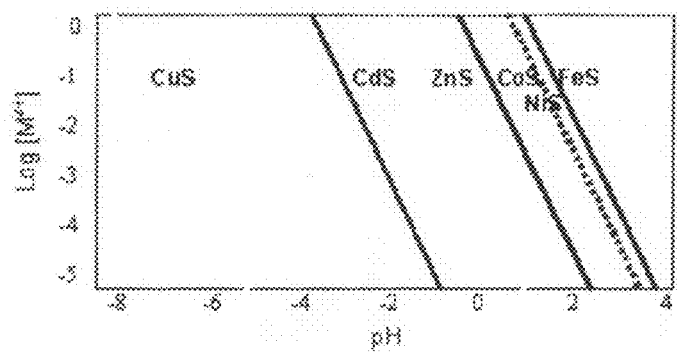
FIG. 1 is a drawing showing a relation between pH and metal concentration in a solution of various metal sulfides.

NOTATION 1 reaction start solution
2 hydrogen sulfide gas
3 aqueous solution containing a sodium hydrosulfide
4 reaction completion solution
5 discharged gas containing an unreacted hydrogen sulfide gas
6 aqueous solution of sodium hydroxide
7 gas washing tower
8 discharge into air
9 sulfurization reactor
11 leaching step
12 solid-liquid separation step
13 neutralization step
14 sulfurization step
15 nickel laterite ore
16 leach slurry
17 leach solution
18 leach residue
19 neutralization precipitate slurry
20 mother liquor for nickel recovery
21 sulfide
22 barren liquor

DETAILED DESCRIPTION OF THE INVENTION

Explanation will be given below in detail on a production process of a sulfide containing nickel and cobalt of the present invention.

A production process of a sulfide containing nickel and cobalt of the present invention is a production process of a sulfide containing nickel and cobalt by adding a sulfurizing agent under pressurization into an aqueous solution of sulfuric acid containing nickel and cobalt, the above sulfurizing agent is characterized by supplying a hydrogen sulfide gas into the vapor phase of inside of a reactor, as a major sulfurizing agent, as well as, by supplying an aqueous solution containing a sodium hydrosulfide, which is obtained by absorbing and recovering an unreacted hydrogen sulfide gas, which is discharged from inside of the reactor in producing the above sulfide, with an aqueous solution of sodium hydroxide, into the liquid phase.

In the present invention, in the production process of a sulfide containing nickel and cobalt, by adding a sulfurizing agent under pressurization into an aqueous solution of sulfuric acid containing nickel and cobalt, it is important to supply a hydrogen sulfide gas into the vapor phase inside a reactor, as a major sulfurizing agent, as well as, to supply an aqueous solution containing sodium hydrosulfide, which is recovered by absorbing unreacted hydrogen sulfide gas, discharged from inside of the reactor in producing the above sulfide, with an aqueous solution of sodium hydroxide, into the liquid phase, as an auxiliary sulfurizing agent.

That is, by supplying, into the liquid phase, an aqueous solution containing a sodium hydrosulfide, which is recovered by absorbing unreacted hydrogen sulfide gas, discharged from inside the reactor in producing the above sulfide, with an aqueous solution of sodium hydroxide, utilization efficiency of hydrogen sulfide gas can be enhanced, as well as, lowering of ph of the liquid phase associated with proceeding of a sulfurization reaction of nickel and cobalt, can be suppressed, re-dissolution caused by increase in solubility of generated NiS and CoS can be reduced, as is clear from FIG. 1, and nickel and cobalt can be recovered, as a sulfide in high yield. Here, FIG. 1 is a drawing showing an equilibrium relation between pH and concentration of a metal dissolves in a solution of various metal sulfides, and it is understood that rise in pH significantly lowers metal concentration in a solution, which is in equilibrium with precipitates of NiS and CoS.

In the above process, nickel or cobalt in the aqueous solution of sulfuric acid containing nickel and cobalt, is sulfurized under pressurization, in accordance with the above expression (1), with hydrogen sulfide gas, which is a major sulfurizing agent supplied into the vapor phase, to generate and precipitate a sulfide of nickel and cobalt.

It should be noted that, in introducing the aqueous solution of sulfuric acid containing nickel and cobalt into a pressurized reactor, and in supplying hydrogen sulfide gas into the vapor phase, concentration of hydrogen sulfide dissolved in the reaction solution is in equilibrium with concentration of hydrogen sulfide in the vapor phase, and in addition, redox potential in the reaction solution has a linear relation with concentration of hydrogen sulfide dissolved, therefore, the sulfurization reaction results in to be performed under predetermined redox potential, which depends on concentration of hydrogen sulfide in the vapor phase.

Accordingly, in a conventional method using only supply of hydrogen sulfide gas, a nickel yield of about 95 to 97% was secured, usually under control of pressure inside of the reactor at predetermined value by blowing a hydrogen sulfide gas into the vapor phase, and by managing an operation conditions such as charge quantity, which is determined by concentration and introduction flow rate of nickel and cobalt of the aqueous solution of sulfuric acid to be introduced into the reactor, as well as temperature and pH at predetermined values, and by operating by adding a sulfide seed crystal, if necessary. However, caused by limitation of concentration of hydrogen sulfide gas in the solution due to rate-determining dissolution rate into the liquid phase or the like, it was difficult to enhance nickel yield more than this level stably.

On the other hand, in the above method, an aqueous solution containing a sodium hydrosulfide is supplied into the liquid phase still more, as an auxiliary sulfurizing agent. Here, a neutralization reaction of sulfuric acid ($H_2SO_4$), which is generated according to the above expression (1), is performed with sodium hydrosulfide (NaHS) according to the following expression (2), and at the same time, in accordance with the following expression (3), by a sulfurization reaction with sodium hydrosulfide, a sulfide containing nickel and cobalt is generated and precipitated.

$$2NaHS + H_2SO_4 \rightarrow Na_2SO_4 + 2H_2S \qquad (2)$$

$$2NaHS + MSO_4 \rightarrow Na_2SO_4 + MS + H_2S \qquad (3)$$

(wherein M represents Ni or Co).

As described above, by supplying the above recovered aqueous solution containing a sodium hydrosulfide, a neutralization reaction of sulfuric acid ($H_2SO_4$), which is generated according to the above expression (1), is performed, and at the same time, a sulfide is generated by an auxiliary sulfurization reaction with sodium hydrosulfide (NaHS), therefore, lowering in pH can be suppressed, and concentration of nickel and cobalt in a reaction completion solution can be maintained at low level stably. As a result, yield of NiS and CoS can be enhanced. In this way, in the process of the present invention, a nickel yield of equal to or higher than about 98% is obtained stably.

In addition, hydrogen sulfide gas generating in the above expressions (2) and (3), also contributes to the reaction effectively. In this way, unreacted hydrogen sulfide gas discharged is utilized in the sulfurization reaction via sodium hydrosulfide, therefore, utilization efficiency of hydrogen sulfide gas can be enhanced significantly.

In the above process, as sodium hydrosulfide, there is used one obtained by absorbing an unreacted hydrogen sulfide gas, which is discharged from the reactor in producing the above sulfide, with an aqueous solution of sodium hydroxide. Naturally, a commercial product of an alkali sulfide can also be utilized, however, in the process of the present invention, there is significance in recovering and utilizing an unreacted hydrogen sulfide gas, which is discharged from the reactor.

A method for absorbing the above unreacted hydrogen sulfide gas with an aqueous solution of sodium hydroxide is not especially limited, and there are used various usual apparatuses excellent in reaction efficiency, such as a gas absorption tower and a washing tower (scrubber), using an aqueous solution of sodium hydroxide as absorbing liquid.

Here, hydrogen sulfide gas in discharged gas forms an aqueous solution containing a sodium hydrosulfide according to the following expression (4). In this case, concentration of the resultant aqueous solution containing a sodium hydrosulfide is not especially limited. It should be noted that, in this case, concentration and supply quantity of the aqueous solution of sodium hydroxide are adjusted, so that an abatement object of hydrogen sulfide gas in discharged gas is attained sufficiently. For example, using the aqueous solution of sodium hydroxide with a concentration of from 15 to 25% by mass, the aqueous solution containing a sodium hydrosulfide with a concentration of from 20 to 35% by mass is obtained.

$$NaOH + H_2S \rightarrow NaHSH_2O \qquad (4)$$

Figure 2:
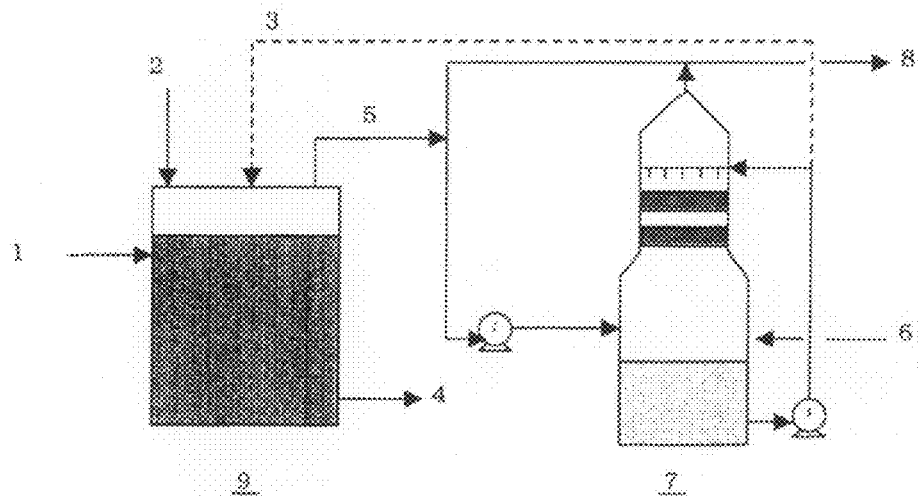
FIG. 2 is a drawing showing one example of a sulfurization reactor, and an apparatus to absorb unreacted hydrogen sulfide gas in discharged gas with an aqueous solution of sodium hydroxide, and produce an aqueous solution containing sodium hydrosulfide, used in the process of the present invention.

Explanation will be given on one example of a facility used in the above process, with reference to a drawing. FIG. 2 is a drawing showing one example of a sulfurization reactor, and a facility to absorb unreacted hydrogen sulfide gas in discharged gas, with an aqueous solution of sodium hydroxide, and produce an aqueous solution containing a sodium hydrosulfide, used in the process of the present invention.

In FIG. 2, a reaction start solution 1 composed of an aqueous solution of sulfuric acid containing nickel and cobalt, is introduced into a pressurized sulfurization reactor 9. On the other hand, as a sulfurizing agent, hydrogen sulfide gas 2 is supplied into the vapor phase of said reactor, and an aqueous solution of sodium hydrosulfide 3 is supplied into the liquid phase to perform the sulfurization reaction of nickel and cobalt, and a reaction completion solution 4 containing a mixed sulfide of nickel and cobalt, is discharged. After that, discharged gas containing unreacted hydrogen sulfide gas from the sulfurization reactor is treated in a gas washing tower 7 using an absorption solution composed of an aqueous solution of sodium hydroxide 6, to obtain gas after abatement to be subjected to discharge 8 into air and the aqueous solution 3 containing a sodium hydrosulfide to be used as a sulfurizing agent.

Pressure of inside of said reactor is not especially limited, however, in order to make the sulfurization reaction of nickel and cobalt proceed, it is preferable to be from 100 to 300 kPa. It should be noted that use of the sulfurization reactor connected in a multi-stage way is efficient, and in this case, it is preferable to set a pressure in the first stage at 250 to 300 kPa, and by gradually decreasing the pressure to set at 100 to 150 kPa in the final stage. In this way, hydrogen sulfide gas is used efficiently in the sulfurization reaction.

The aqueous solution of sulfuric acid containing nickel and cobalt used in the above process is not especially limited, and various ones can be used, however, among them, mother liquor for nickel recovery obtained by separation of iron from a leach solution obtained in the step leaching under high temperature and high pressure, by adding sulfuric acid into slurry of a nickel laterite ore, in a hydrometallurgical process of a nickel laterite ore by High Pressure Acid Leach, is used preferably. That is, the process of the present invention is applied preferably in a hydrometallurgical process of a nickel laterite ore by the above High Pressure Acid Leach, as a production process of a sulfide containing nickel and cobalt, in the sulfurization step thereof.

Figure 3:
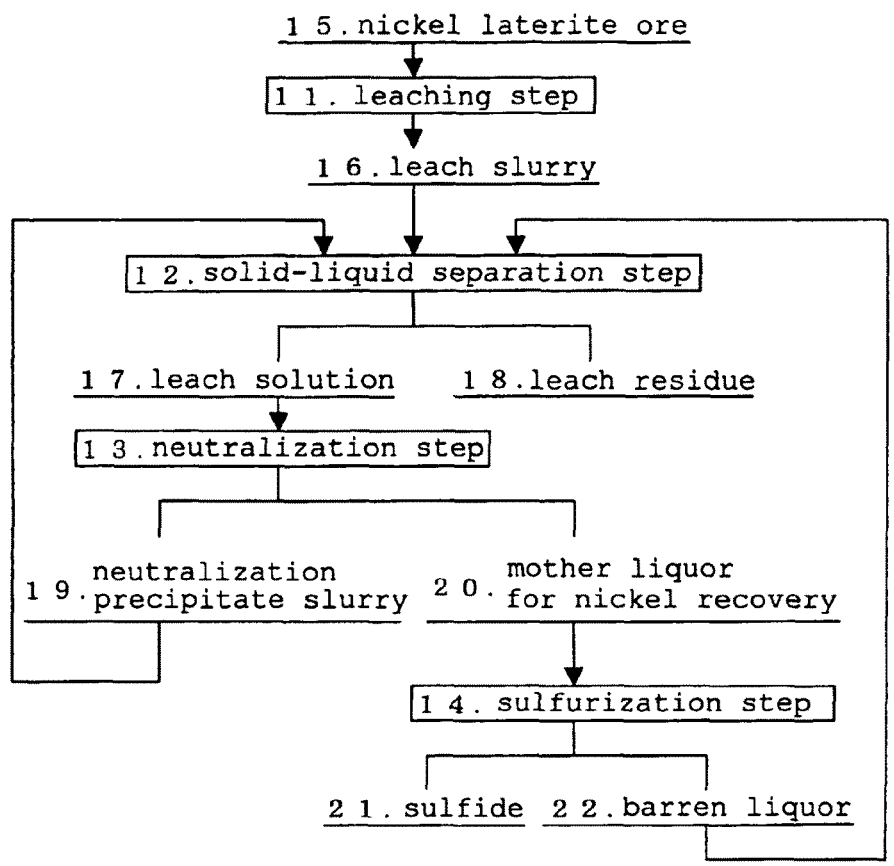
FIG. 3 is a process chart showing one example of an embodiment of a hydrometallurgical process of a nickel laterite ore by High Pressure Acid Leach.

The hydrometallurgical process of a nickel laterite ore by the above High Pressure Acid Leach, is not especially limited, however, for example, it is performed by a process flow shown in FIG. 3. FIG. 3 is a process chart showing one example of an embodiment of a hydrometallurgical process of a nickel laterite ore by High Pressure Acid Leach.

In FIG. 3, a nickel laterite ore 15 is subjected first to leaching at high temperature and high pressure using sulfuric acid in a leaching step 11 to form a leach slurry 16. Then the leach slurry 16 is subjected to a solid-liquid separation step 12 to be separated into a leach solution 17 containing nickel and cobalt, and a leach residue 18, after multi-stage washing. The leach solution 17 is subjected to a neutralization step 13 to form a neutralization precipitate slurry 19 containing a trivalent iron hydroxide, and a mother liquor for nickel recovery 20. Finally, the mother liquor 20 for nickel recovery is subjected to a sulfurization step 14 to be separated into a sulfide containing nickel and cobalt 21, and barren liquor 22 removed nickel or the like.

The above mother liquor for nickel recovery is one obtained, for example, in a hydrometallurgical process of the above nickel laterite ore by the High Pressure Acid Leach, in the leaching and solid-liquid separation step, by adding sulfuric acid into slurry of nickel laterite ore, by leaching under high temperature and high pressure, and under multi-stage washing of the leach slurry, to obtain a leach solution containing impurity elements such as iron, manganese, magnesium, chromium and aluminum, together with nickel and cobalt, and then, in the neutralization step, by separating neutralization precipitate slurry containing impurity elements such as iron, by adjusting pH of this leach solution. It should be noted that, in the case where zinc is contained in the above mother liquor for nickel recovery, in quantity which induces technical problems in a recovering step of nickel and cobalt, from a sulfide containing nickel and cobalt, a sulfurization step for separating zinc sulfide may be provided separately before separating the sulfide containing nickel and cobalt.

In addition, total concentration of nickel and cobalt, of the above mother liquor for nickel recovery is not especially limited, however, it is usually from 2 to 6 g/L. Here, as nickel concentration, it is from 2 to 5 g/L, and as cobalt concentration, it is from 0.1 to 0.6 g/L.

Supply quantity of hydrogen sulfide gas to be used in the above process is not especially limited, however, to recover nickel and cobalt, as a sulfide in predetermined high yield, it is sufficient to be about 1.0 to 1.1 time reaction equivalent required to sulfurize nickel and cobalt contained in the aqueous solution of sulfuric acid containing nickel and cobalt, according to the above expression (1). The addition in excess quantity than this leads to increase in quantity of unreacted hydrogen sulfide gas discharged from the reactor.

It should be noted that as the above hydrogen sulfide gas, there is used gas for sulfurization, which is supplied from a synthesis facility of hydrogen sulfide gas installed in said plant, in a practical plant of the above High Pressure Acid Leach, and concentration of hydrogen sulfide gas is from 95 to 100% by volume in a normal operation state.

As pH of the aqueous solution of sulfuric acid used in the above process, it is not especially limited, however, to make the sulfurization reaction proceed, it is preferable to be from 3.0 to 3.8. That is, the pH of the aqueous solution of sulfuric acid of below 3.0 is enable to remove iron, aluminum and the like sufficiently in the neutralization step at the stage before. On the other hand, the pH of the aqueous solution of sulfuric acid of over 3.8 could generate a hydroxide of nickel or cobalt.

Temperature of the aqueous solution of sulfuric acid used in the above process is not especially limited, however, it is preferable to be from 65 to 90° C. That is, the higher temperature generally promotes the sulfurization reaction itself the more, however, the temperature of over 90° C. raises many problems such as high cost to elevate the temperature, and generation of many adhesion of sulfides onto the reactor caused by high reaction rate.

EXAMPLES

Explanation will be given below in still more detail on the present invention, with reference to Examples and Comparative Examples of the present invention, however, the present invention should not be limited to these Examples. It should be noted that, analysis of metals used in Examples and Comparative Examples was carried out by an ICP emission spectrometry, as well as, analysis of concentration of hydrogen sulfide gas was carried out by a UV-type measurement instrument.

Example 1 and Comparative Example 1

In producing a mixed sulfide of nickel and cobalt in a plant of High Pressure Acid Leach of a nickel laterite ore, operations were performed in the case where a hydrogen sulfide gas and an aqueous solution of recovered sodium hydrosulfide were supplied as a sulfurizing agent (Example 1), and the case where only hydrogen sulfide gas was supplied as a sulfurizing agent (Comparative Example 1) to evaluate pH of a reaction completion solution, nickel recovery rate (nickel yield as a sulfide) and utilization efficiency of hydrogen sulfide gas.

Here, as the sulfurization step, there were used a sulfurization reactor (but a four-stage type) of a similar type as shown in FIG. 2 and a gas washing tower for producing an aqueous solution containing a sodium hydrosulfide from unreacted hydrogen sulfide gas in discharged gas.

It should be noted that, in usual operation, because supply flow rate and composition of a reaction start solution to be introduced to the sulfurization step, vary by composition variation of a raw material ore, a leaching step, a solid-liquid separation step, a neutralization step and the like, it was limited to the case where introduction flow rate of the reaction start solution introduced to the sulfurization step was from 350 to 400 $m^3/H$, and Ni concentration was from 3.7 to 4.1 g/L, to perform evaluation of both by excluding influence thereof as much as possible. In this case, concentration of hydrogen sulfide gas was from 95 to 100% by volume, pH of the above reaction start solution was from 3.1 to 3.6, reaction temperature was from 65 to 90° C., a typical example of pressure of inside of the sulfurization reactor was 270 kPa at the first stage, 220 kPa at the second stage, 180 kPa at the third stage, and 150 kPa at the fourth stage. In addition, area of vapor-liquid interface of the sulfurization reactor was from 100 to 120 $m^2$ in total of the four stages. In addition, in Example 1, the aqueous solution of sodium hydrosulfide with a concentration of from 20 to 35% by volume, recovered from the above gas washing tower, was supplied in a flow rate of 1.5 $m^3/H$.

Figure 4:
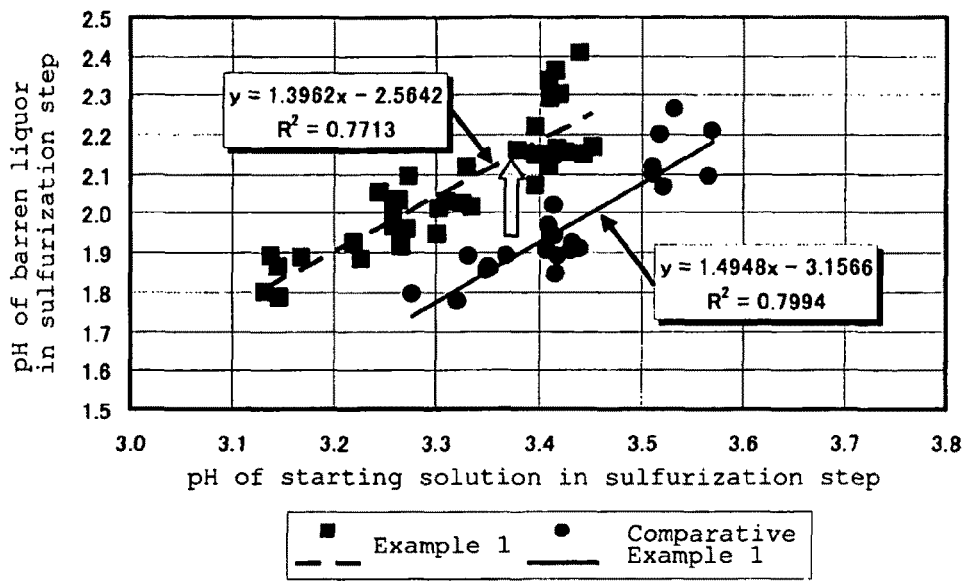
FIG. 4 is a drawing showing a relation between pH of a reaction start solution and a reaction complete solution of sulfurization step, in Example 1 and Comparative Example 1.
Figure 5:
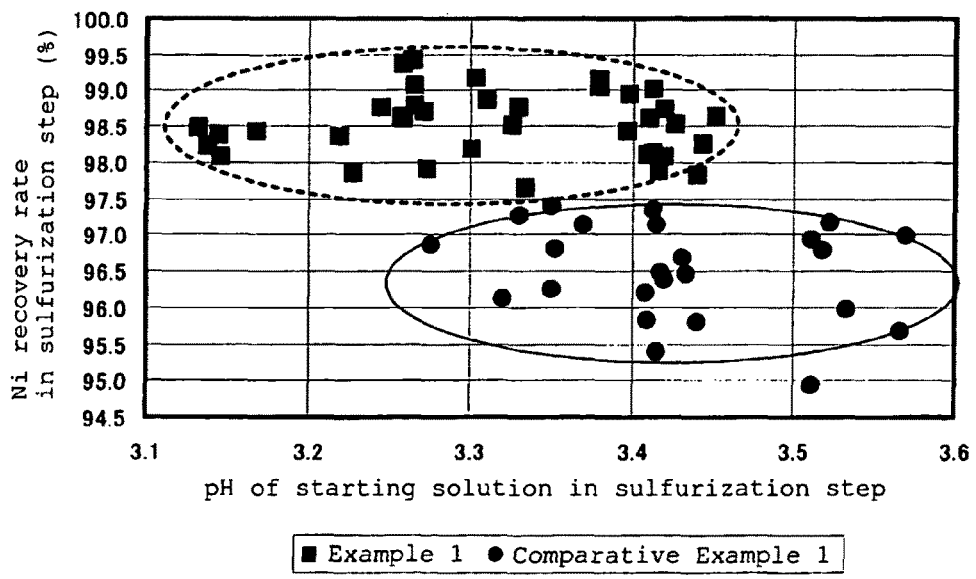
FIG. 5 is a drawing showing a relation between pH of a reaction start solution and nickel recovery rate, in Example 1 and Comparative Example 1.

The results are shown in FIGS. 4 and 5. FIG. 4 shows relation between pH of a reaction start solution and a reaction complete solution, in Example 1 and Comparative Example 1. FIG. 5 shows relation between pH of a reaction start solution and nickel recovery rate, in Example 1 and Comparative Example 1. Here, nickel recover rate was determined from changes of nickel concentrations of the reaction start solution and the reaction completion solution.

From FIG. 4, it is understood that, in pH of the same reaction start solution, pH of the reaction completion solution was about 0.3 higher in Example 1 as compared with Comparative Example 1, and thus the addition of sodium hydrosulfide suppresses the lowering of pH. In addition, from FIG. 5, it is understood that, in pH of the same reaction start solution, nickel recovery rate was from 97.5 to 99.5% in Example 1, higher about 2%, compared with from 95.0 to 97.5% in Comparative Example 1, and thus the addition of sodium hydrosulfide provides the high nickel yield stably.

Still more, utilization efficiency of hydrogen sulfide gas in this case was 88% in average in Comparative Example 1, while 93% in average in Example 1, and it was confirmed from this that increase in utilization efficiency of hydrogen sulfide gas of about 5% was obtained. It should be noted that utilization efficiency of hydrogen sulfide gas was determined from the number of mole of $H_2S$ used in the sulfurization reaction of nickel, and the number of mole of $H_2S$ supplied.

As is clear from the above, a production process of a sulfide containing nickel and cobalt of the present invention, is used preferably in a sulfurization step for recovering nickel and cobalt as a sulfide from mother liquor for nickel recovery obtained by separation of iron from a leach solution obtained in the step leaching under high temperature and high pressure, by adding sulfuric acid into slurry of a nickel laterite ore, in a hydrometallurgical process of a nickel laterite ore by High Pressure Acid Leach.

What is claimed is:

1. A production process of a sulfide containing nickel and cobalt by adding a sulfurizing agent under pressurization into an aqueous solution of sulfuric acid containing nickel and cobalt, wherein pH of the aqueous solution is from 3.0 to 3.8, characterized by supplying, as the sulfurizing agent, hydrogen sulfide gas into the vapor phase of inside of a reactor, as a major sulfurizing agent, as well as, by supplying an aqueous solution containing a sodium hydrosulfide, which is obtained by absorbing and recovering an unreacted hydrogen sulfide gas, which was discharged from inside of the reactor in producing the above sulfide, with an aqueous solution of sodium hydroxide, which is used as an absorbing liquid in a gas washing tower outside of the reactor, into liquid phase.

2. The production process of a sulfide containing nickel and cobalt, according to claim 1, characterized in that pressure inside of the reactor is from 100 to 300 kPa.

3. The production process of a sulfide containing nickel and cobalt, according to claim 2, characterized in that temperature of the aqueous solution of sulfuric acid containing nickel and cobalt, is from 65 to 90° C.

4. The production process of a sulfide containing nickel and cobalt, according to claim 2, characterized in that the aqueous solution of sulfuric acid containing nickel and cobalt, is mother liquor for nickel recovery obtained by separation of iron from a leach solution obtained in the step leaching under high temperature and high pressure, adding sulfuric acid into slurry of a nickel laterite ore, in hydrometallurgical process of the nickel laterite ore by High Pressure Acid Leach.

5. The production process of a sulfide containing nickel and cobalt, according to claim 1, characterized in that temperature of the aqueous solution of sulfuric acid containing nickel and cobalt, is from 65 to 90° C.

6. The production process of a sulfide containing nickel and cobalt, according to claim 5, characterized in that the aqueous solution of sulfuric acid containing nickel and cobalt, is mother liquor for nickel recovery obtained by separation of iron from a leach solution obtained in the step leaching under high temperature and high pressure, adding sulfuric acid into slurry of a nickel laterite ore, in hydrometallurgical process of the nickel laterite ore by High Pressure Acid Leach.

7. The production process of a sulfide containing nickel and cobalt, according to claim 1, characterized in that the aqueous solution of sulfuric acid containing nickel and cobalt, is mother liquor for nickel recovery obtained by separation of iron from a leach solution obtained in the step leaching under high temperature and high pressure, adding sulfuric acid into slurry of a nickel laterite ore, in hydrometallurgical process of the nickel laterite ore by High Pressure Acid Leach.

8. The production process of a sulfide containing nickel and cobalt, according to claim 3, characterized in that the aqueous solution of sulfuric acid containing nickel and cobalt, is mother liquor for nickel recovery obtained by separation of iron from a leach solution obtained in the step leaching under high temperature and high pressure, adding sulfuric acid into slurry of a nickel laterite ore, in hydrometallurgical process of the nickel laterite ore by High Pressure Acid Leach.

* * * * *